(12) United States Patent
Kidambi

(10) Patent No.: US 11,012,431 B2
(45) Date of Patent: May 18, 2021

(54) SECURE SHARING OF PEERING CONNECTION PARAMETERS BETWEEN CLOUD PROVIDERS AND NETWORK PROVIDERS

(71) Applicant: INTERNATIONAL BUSINESS MACHINES CORPORATION, Armonk, NY (US)

(72) Inventor: Jayakrishna Kidambi, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 471 days.

(21) Appl. No.: 16/050,657

(22) Filed: Jul. 31, 2018

(65) Prior Publication Data
US 2020/0045029 A1     Feb. 6, 2020

(51) Int. Cl.
*H04L 29/06* (2006.01)
*H04L 29/08* (2006.01)
*H04L 12/46* (2006.01)

(52) U.S. Cl.
CPC ........ *H04L 63/061* (2013.01); *H04L 12/4679* (2013.01); *H04L 63/067* (2013.01); *H04L 67/10* (2013.01); *H04L 67/16* (2013.01)

(58) Field of Classification Search
CPC ... H04L 63/061; H04L 63/067; H04L 63/068; H04L 63/08; H04L 63/083;
(Continued)

(56) References Cited

U.S. PATENT DOCUMENTS 6,512,754 B2   1/2003   Feder et al.
9,391,951 B2   7/2016   van Bemmel
(Continued)

FOREIGN PATENT DOCUMENTS

WO      2015026336 A1    2/2015

OTHER PUBLICATIONS

Mell et al., "The NIST Definition of Cloud Computing," National Institute of Standards and Technology, Sep. 2011, p. 1-3, Special Publication 800-145.
(Continued)

*Primary Examiner* — Minh Dinh
(74) *Attorney, Agent, or Firm* — Rakesh Roy

(57) ABSTRACT

A method, computer system, and a computer program product for sharing a peering connection parameter is provided. The present invention may include receiving a peering connection order from a user. The present invention may also include assigning at least one shared secret to the received peering connection order. The present invention may then include receiving a request from a network service provider of the user for at least one connection parameter associated with the received peering connection order, wherein the received request includes the at least one shared secret for the received peering connection order. The present invention may further include, in response to determining that the at least one shared secret included in the received request is valid, returning the at least one connection parameter associated with the received peering connection order to the network service provider of the user.

20 Claims, 5 Drawing Sheets

(58) Field of Classification Search
CPC ............ H04L 63/0838; H04L 63/0846; H04L 9/0819; H04L 67/10; H04L 67/16; H04L 12/4679
See application file for complete search history.

(56) References Cited

U.S. PATENT DOCUMENTS

| | | | | |
|---|---|---|---|---|
| 9,485,772 | B2 | 11/2016 | Tiger | |
| 9,933,763 | B1* | 4/2018 | Menkveld | ............ H04L 67/025 |
| 2011/0258333 | A1* | 10/2011 | Pomerantz | ............. H04L 63/08 |
| | | | | 709/229 |
| 2013/0041931 | A1* | 2/2013 | Brand | ................... G06F 16/13 |
| | | | | 709/203 |
| 2015/0281107 | A1 | 10/2015 | Dorcey | |
| 2016/0088068 | A1 | 3/2016 | Toy | |
| 2016/0337175 | A1* | 11/2016 | Rao | ........................ H04L 41/12 |
| 2018/0359323 | A1* | 12/2018 | Madden | ................ H04L 67/104 |

OTHER PUBLICATIONS

Park et al., "Improved Identity Management Protocol for Secure Mobile Cloud Computing," 46th Hawaii International conference on System Sciences, 2013, p. 4958-4965, IEEE Computer Society.

* cited by examiner

SECURE SHARING OF PEERING CONNECTION PARAMETERS BETWEEN CLOUD PROVIDERS AND NETWORK PROVIDERS

BACKGROUND

The present invention relates generally to the field of computing, and more particularly to cloud computing.

Users of cloud services often bridge their cloud-premises networks and their traditional, remote-premises networks with dedicated network connections. The dedicated network connectivity provides a secure, reliable, and low latency connection to move data between the remote network environments and the cloud network environments of a mutual user. When connecting or peering a cloud-premises network and a remote-premises network of the mutual user, direct exchange of information between a cloud service provider and a network service provider is often necessary. This direct exchange may lead to security concerns, such as, oversharing of information between the cloud service provider and the network service provider about the mutual user.

SUMMARY

Embodiments of the present invention disclose a method, computer system, and a computer program product for sharing peering connection parameters. The present invention may include receiving a peering connection order from a user. The present invention may also include assigning at least one shared secret to the received peering connection order. The present invention may then include receiving a request from a network service provider of the user for at least one connection parameter associated with the received peering connection order, wherein the received request includes the at least one shared secret for the received peering connection order. The present invention may further include, in response to determining that the at least one shared secret included in the received request is valid, returning the at least one connection parameter associated with the received peering connection order to the network service provider of the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
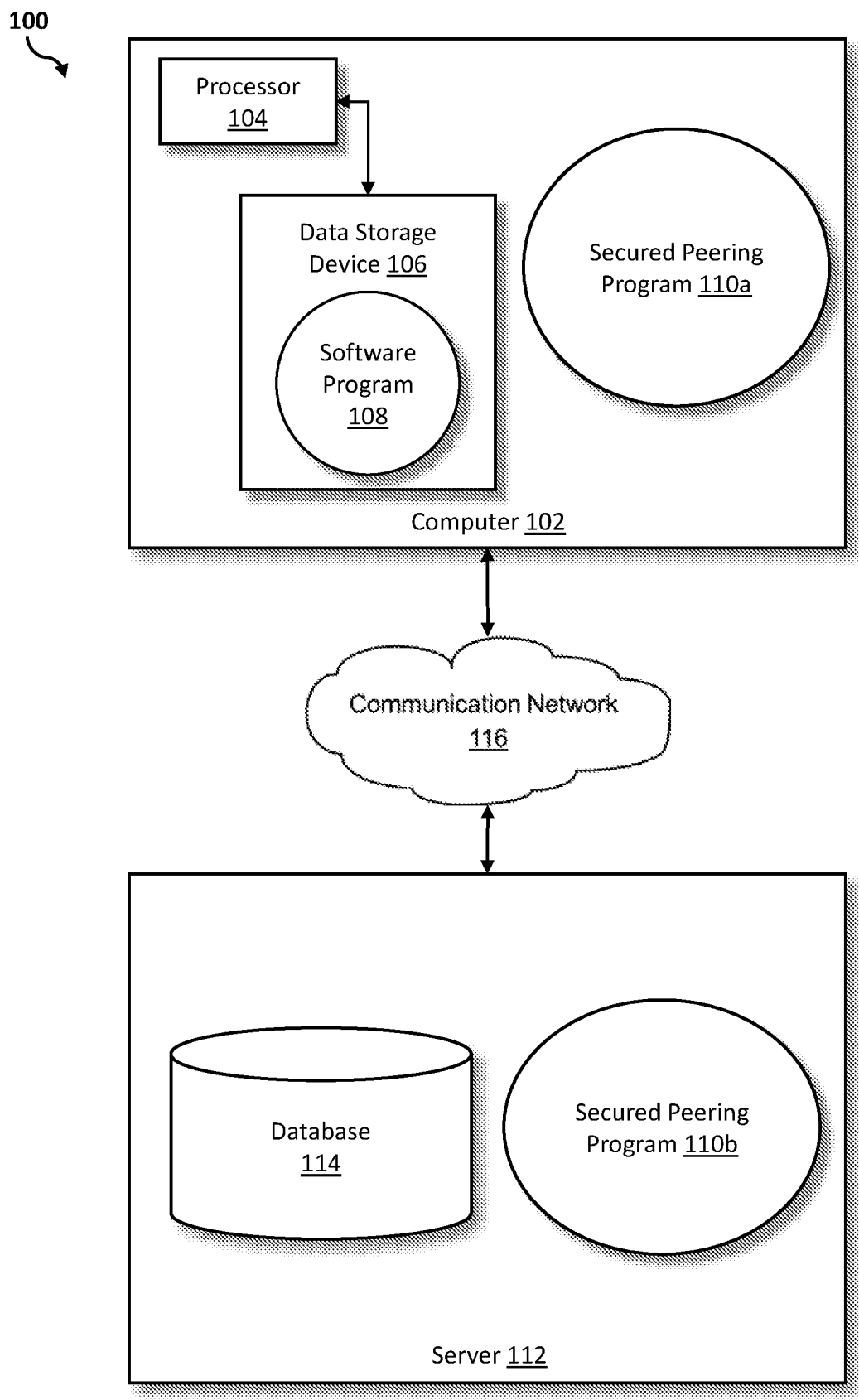
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for a cloud service provider (CSP) to securely share peering connection parameters with a network service provider (NSP). As such, the present embodiment has the capacity to improve the technical field of cloud computing by providing a secured, light-weight mechanism for a CSP to publish an interface that would allow any NSP associated with a mutual user to retrieve from the CSP, in exchange for a shared secret, connection parameter details for a peering connection between the CSP and the NSP of the mutual user. More specifically, the CSP of a user may publish an application programming interface (API) at a trusted host name and the NSP of the mutual user may invoke the API of the CSP to retrieve configuration details regarding the peering connection request of the mutual user.

The API call from the NSP to the CSP may be required to include secret values (e.g., authentication keys) and the CSP may check the validity of the included secret values before accepting the API request from the NSP. Specifically, the API call invoked by the NSP may include a service key and a temporary access key originally generated by the CSP for the peering connection order of the user and shared to the NSP by the mutual user. The CSP may validate the API call invoked by the NSP, for example, by verifying the service key and the temporary access key. If the API call is determined to be legitimate by the CSP, the CSP may return, to the NSP, the technical connection parameters governing the peering connection order submitted by the mutual user. In one embodiment, the underlying connection between the CSP and the NSP may include transport layer security to provide privacy and data integrity to the communication between the CSP and the NSP.

As described previously, users of cloud services often bridge their cloud-premises networks and their traditional, remote-premises networks with dedicated network connections in order to take advantage of the secure, reliable, and low latency connections afforded by dedicated network connectivity. Self-service is a key ingredient of the cloud consumption model and the user is able to provision/order cloud services via an interface (e.g., API or web portal) of the CSP without the need for human intervention. Peering connections between a CSP and an NSP typically involve three parties: the user (e.g., customer), the CSP, and the NSP. The user typically engages (e.g., via respective interfaces) with both the CSP and the NSP to perform the operations specific to each side for setting up such a peering connection. Thereafter, the CSP and the NSP perform a direct exchange of information regarding the peering connection order submitted by the mutual user in order to allow for independent and error-free confirmation of the technical parameters that would govern the peering connection. As currently implemented, the CSP is required to perform a formal NSP onboarding process to identify the NSP with the CSP's account management system before the direct exchange of information between the CSP and the NSP can take place. Further, current implementations of the direct exchange process do not provide a standard integration between CSPs and NSPs. As such, CSPs develop individual interfaces for each NSP and incur the associated development costs.

Therefore, it may be advantageous to, among other things, provide a CSP interface for returning peering connection parameters to an NSP's request, in exchange for valid shared secrets included with the NSP's request for the peering connection parameters. This mechanism may ensure that only legitimate parties to the transaction (e.g., the mutual customer and/or the NSP working with the mutual customer) receive the peering connection parameters from the CSP. In addition, this mechanism may provide a way for the CSP to quickly and securely identify the NSP without having to maintain and manage an NSP account with the CSP account management system. Furthermore, this mechanism may provide a way for the NSP to perform the peering connection with the CSP of a mutual customer without requiring access to the CSP user/account credentials of the mutual customer.

According to at least one embodiment, a user (e.g., customer) of the CSP may submit a peering connection order with the CSP and may receive a randomly-generated connection identifier (e.g., 128-bit "service key") from the CSP upon verification of the peering connection order. The customer may also request a temporary access key from the CSP associated with the peering connection order and may receive another randomly-generated temporary "access key" (e.g., 128-bit temporary access key valid for 24 hours) from the CSP in return. The customer may then submit the peering connection order with the NSP and share the associated service key and temporary access key assigned by the CSP. Next, the NSP may submit a request to retrieve the peering connection parameters through the API published by the CSP and may include the associated service key and temporary access key shared by the customer. By invoking the API published by the CSP, the NSP may verify that the CSP has a corresponding peering connection order from the mutual customer and may retrieve the peering connection parameters from the CSP. The CSP may validate the API call of the NSP using a special internal service access key and may return the peering connection parameters to the NSP for legitimate connection requests. Thereafter, the NSP may use the returned peering connection parameters from the CSP to configure and complete the peering connection process with the CSP.

In the present embodiment, the unique combination of the service key and the temporary access key provided by the CSP may not be guessed or determined by a fourth party. Thus, without needing additional authentication mechanisms, the unique combination of the service key and the temporary access key may ensure that the peering connection request received by the CSP is made by an entity (e.g., NSP) authorized by the user who created the peering connection order with the CSP. In addition, the temporary nature of the temporary access key may provide that the user may safely share the access key with the NSP, since the access key may not work with the CSP after a pre-defined period of time. According to at least another embodiment, the CSP may provide a well-recognized domain name for the CSP API endpoint. As such, the NSP may recognize the domain name of the API endpoint and trust the communication between the NSP and the CSP.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a secured peering program 110a. The networked computer environment 100 may also include a server 112 that is enabled to run a secured peering program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the secured peering program 110a, 110b may interact with a database 114 that may be embedded in various storage devices, such as, but not limited to a computer/mobile device 102, a networked server 112, or a cloud storage service.

According to the present embodiment, a user (e.g., customer) using a client computer 102 or a server computer 112 may use the secured peering program 110a, 110b (respectively) to submit an order with a cloud service provider (CSP) to perform a peering connection between the cloud-premises network provided by the CSP and a remote-premises network provided by a network service provider (NSP) of the mutual user. The secured peering method is explained in more detail below with respect to FIG. 2.

Figure 2:
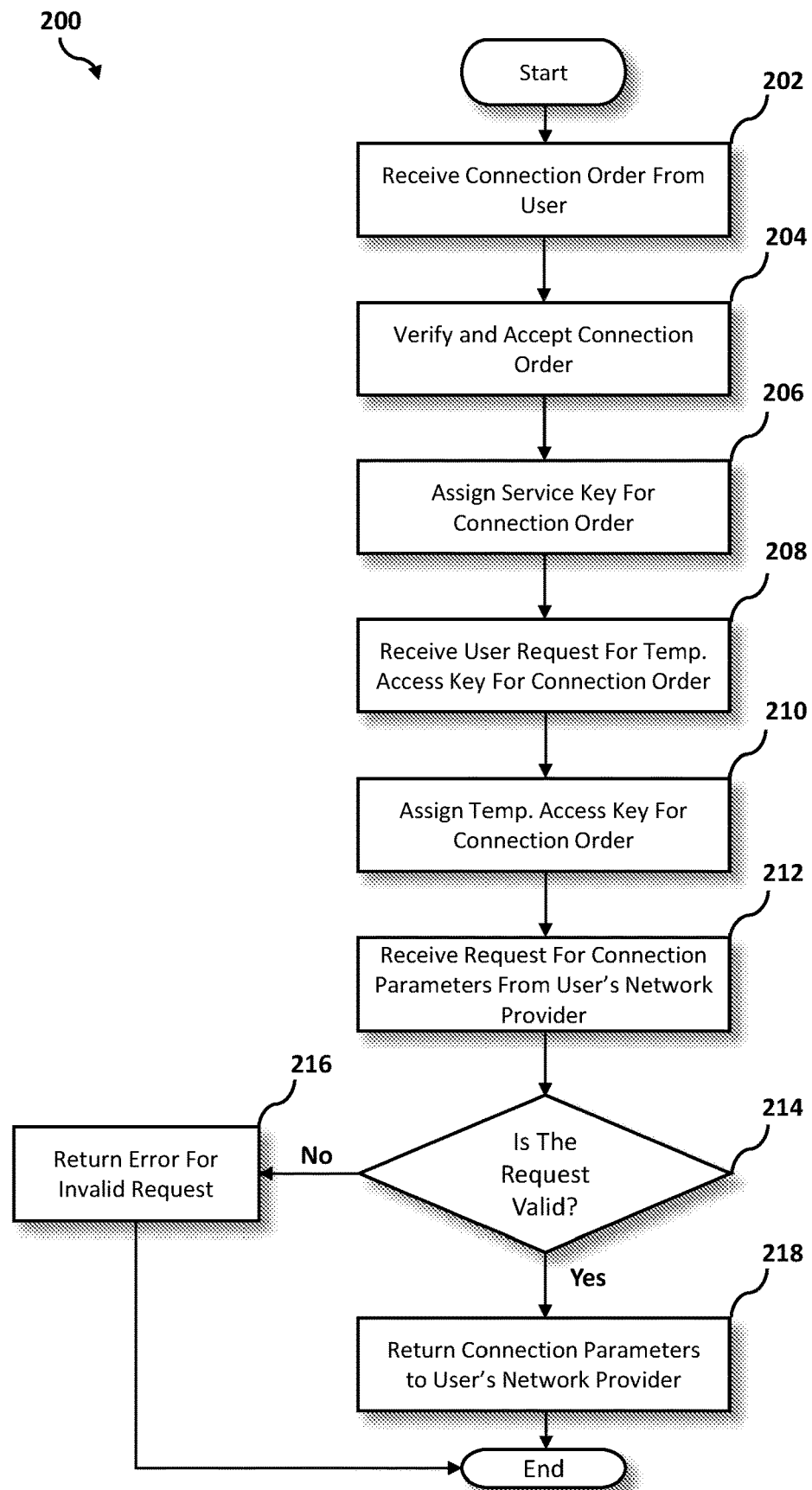
FIG. 2 is an operational flowchart illustrating a process for secret-based parameter sharing according to at least one embodiment.

Referring now to FIG. 2, an operational flowchart illustrating the exemplary secret-based parameter sharing process 200 used by the secured peering program 110a and 110b according to at least one embodiment is depicted.

At 202, a connection order is received from a user. The CSP of the user (e.g., customer) may provide the secured peering program 110a, 110b running on a user device (e.g., client computer 102). The secured peering program 110a, 110b may provide a CSP console or portal via which the user may submit an order to create a peering connection between the CSP and the NSP of the user. Before the user may submit the peering connection order, the secured peering program 110a, 110b may prompt the user to identify a user profile associated with the CSP system by logging in through the CSP portal (e.g., via entering text in a login page) with one or more user credentials (e.g., username, e-mail address, passwords/passphrases). The secured peering program 110a, 110b may then identify the user by verifying the entered user credentials against the user profile maintained in a directory, such as, an identity and access management (IAM) system of the CSP stored on a server 112.

In one embodiment, the secured peering program 110a, 110b may provide, in the login prompt to the user, an option to initialize a new user profile if the user is not a return user. The secured peering program 110a, 110b may initialize the new user profile using one or more known methods and upload the initialized user profile to a cloud environment for storage in the IAM system of the CSP on the server 112 via a communication network 116. On the server 112, the initialized user profile may be stored within a data repository, such as a database 114. In addition to storing the user credentials associated with the CSP system, the user profile may include information regarding CSP services provided to the user (e.g., user account summary, billing information) and one or more user preferences regarding user engagement with the secured peering program 110a, 110b.

After the user is logged in through the CSP portal, the secured peering program 110a, 110b may provide the user with a user interface, for example, a purchasing platform via which the user may order various products/services associated with the CSP. In one embodiment, the secured peering program 110a, 110b may provide in the purchasing platform, an "Order Peering Connection" button which the user may select, via the user device, to request the peering connection. After the user requests the peering connection order, the secured peering program 110a, 110b may provide the user with an order form including text fields for receiving user entered configuration parameters pertaining to the requested peering connection order. According to at least one embodiment, the secured peering program 110a, 110b may prompt the user to enter, via the order form, the location where the NSP of the user will peer with the CSP of the user, the name of the NSP of the user, the desired link speed of the peering connection, and any other peering connection properties. In one embodiment, the secured peering program 110a, 110b may also prompt the user to enter, via the order form, payment information (e.g., credit card number, billing address) for the peering connection order or provide the user with an option to apply payment information stored in the user profile. The secured peering program 110a, 110b may provide a "Submit Order" button which the user may select via the user device to place the peering connection order.

According to one embodiment, the secured peering program 110a, 110b may provide the user with instructions, via the purchasing platform of the CSP portal, regarding further steps to perform the peering connection between the CSP and the NSP. The instructions may indicate that the secured peering program 110a, 110b may provide the user with a service key and a temporary access key associated with the peering connection order. The instructions may also indicate that the user may need to provide the NSP with the service key and the temporary access key, which the NSP may use to gain temporary permission to retrieve information from the CSP to complete the peering connection.

For example, the user may want to set up a peering connection between the CSP of the user, cloud company ABC, and the NSP of the user, network company XYZ. In order to begin the peering connection setup, the user may engage the CSP of the user. Specifically, the user may interact with a laptop and start the secured peering program 110a, 110b of the cloud company ABC. The secured peering program 110a, 110b may provide the CSP portal and may prompt the user to login to the user profile by entering text into the login page of the CSP portal or to create a new user profile by clicking a new user button. The user may reply by textually entering an e-mail address and password associated with the user profile of the cloud company ABC. The secured peering program 110a, 110b may then identify the user by verifying the entered user credentials against the user profile maintained in the IAM system of the CSP stored on the server 112. After the user is identified by the secured peering program 110a, 110b, the secured peering program 110a, 110b may direct the user to the purchasing platform of the cloud company ABC. In the purchasing platform, the user may select, via the user laptop, the "Order Peering Connection" button provided by the secured peering program 110a, 110b.

In response to receiving the user request for the peering connection service, the secured peering program 110a, 110b may provide the user with an order form to receive user entered configuration parameters including, the location where the NSP of the user will peer with the CSP of the user, the name of the NSP of the user, and the desired link speed of the peering connection. For example, the user may enter "Dallas" for the location where the NSP will peer with the CSP, "network company XYZ" for the name of the NSP, and "100 Mbps" for the desired link speed of the peering connection. The user may then textually enter payment information into the order form, including a credit card number and billing address, and click a "Submit Order" button in the purchasing platform to place the peering connection order.

Next, at 204, the connection order is verified and accepted. After the user submits the peering connection order at 202, the secured peering program 110a, 110b may verify the accuracy of the data entered by the user in the order form provided in the purchasing platform. In one embodiment, the secured peering program 110a, 110b may verify the order to ensure that the order originated from the identified user. According to at least one embodiment, the secured peering program 110a, 110b may cross-check the user entered information at 202 associated with the payment method, with the user information stored in a data structure of the bank or credit card institution associated with the payment method. In at least one embodiment, the secured peering program 110a, 110b may transmit an e-mail, text message, or telephone call to the contact information stored in the user profile, in order to verify that the peering connection order was submitted by the user associated with the user profile. After verifying the peering connection order, the secured peering program 110a, 110b may generate a receipt or ticket for the verified peering connection order.

Continuing with the previous example, after the secured peering program 110a, 110b of the cloud company ABC receives a peering connection order in the purchasing platform of the CSP portal, the secured peering program 110a, 110b may cross-check the user entered billing information associated with a credit card X with the user information stored in the data structure of the credit card X company. In one embodiment, the secured peering program 110a, 110b of the cloud company ABC may also send an order verification e-mail to the user e-mail address stored in the user profile. After verifying the peering connection order, the secured peering program 110a, 110b of the cloud company ABC may generate a ticket for the verified peering connection order submitted by the user.

Then, at 206, a service key is assigned for the connection order. After the secured peering program 110a, 110b verifies the peering connection order received from the user, the secured peering program 110a, 110b may automatically assign a connection identifier or service key to the peering connection order. The service key may be a universally unique identifier (UUID) of the peering connection order received from the user. According to one embodiment, the secured peering program 110a, 110b may include or implement a key management system to randomly generate a UUID for the service key assigned to the peering connection order. In at least one embodiment, the service key may include an encrypted, randomly-generated 128-bit value. However, in another embodiment, the secured peering program 110a, 110b may provide an encrypted, randomly-generated service key of any suitable size. The secured peering program 110a, 110b may implement the key management system to maintain an inventory including the service key and the associated peering connection order. In at least one embodiment, the secured peering program 110a, 110b may maintain the inventory of the service key and the associated peering connection order in the IAM system of the CSP. According to one embodiment, the secured peering program 110a, 110b may provide the service key in the receipt or ticket generated for the peering connection order of the user. In another embodiment, the secured peering program 110a, 110b may provide the service key for the peering connection order in the user account page of the CSP portal.

Continuing with the previous example, the secured peering program 110a, 110b of the cloud company ABC may implement the key management system to randomly-generate the 128-bit service key: "519edd4e-d14b-4266-b3a2-2c78f9cd280b" for the peering connection order. Then, the secured peering program 110a, 110b may catalogue the service key and the associated peering connection order in an inventory maintained by the key management system of the cloud company ABC. Thereafter, the secured peering program 110a, 110b may provide the user with the service key: "519edd4e-d14b-4266-b3a2-2c78f9cd280b" in the ticket generated for the peering connection order of the user. The secured peering program 110a, 110b may provide the user with the ticket generated for the peering connection order via an order summary page of the purchasing platform or a user account page of the CSP portal.

Then, at 208, a request for a temporary access code for the connection order is received. When the secured peering program 110a, 110b provides the user with the service key for the peering connection order, the secured peering program 110a, 110b may also provide the user with the option to request a temporary access key for the peering connection order for example, via a "Request Access Key" button in the order summary page or the user account page of the CSP portal. The secured peering program 110a, 110b may provide the user with the option to request the temporary access key at the same time or at a later time relative to when the user receives the service key from the secured peering program 110a, 110b. The user may interact with the user device (e.g., via clicking the "Request Access Key" button in the order summary page or user account page) to transmit the user request for the temporary access key to the secured peering program 110a, 110b.

In one embodiment, the secured peering program 110a, 110b may implement the temporary access key to expire after a set period of time. The secured peering program 110a, 110b may provide the user with the option to specify a time period for which the temporary access key may be valid. The secured peering program 110a, 110b may also provide a nominal default time period of, for example, 24 hours for which the temporary access key may be valid, if the user does not specify a time period. Specifically, the secured peering program 110a, 110b may implement (e.g., via the key management system) a system-defined expiration (e.g., 24 hours) for the temporary access key and/or provide the user with the option (e.g., via the user account page) to set a user-defined expiration for the temporary access key. In at least one embodiment, the secured peering program 110a, 110b may start the temporary access key expiration timer from the time the temporary access key is assigned to the peering connection order of the user. After the allotted time, the secured peering program 110a, 110b may revoke the permission of the temporary access key so that the NSP may not be able to use the temporary access key to retrieve peering connection information from the CSP. In this manner, the temporary nature of the temporary access key may provide the user with a measure of security when the user shares the temporary access key with the NSP. The temporary nature of the access key may reduce the impact of losing one or both of the keys. In another embodiment, the secured peering program 110a, 110b may provide the user with the option to request another temporary access key or renew the original temporary access key if the system-defined/user-defined timer on the temporary access key expires.

Continuing with the previous example, when the secured peering program 110a, 110b of the cloud company ABC provides the user with the service key for the peering connection order in the order summary page of the purchasing platform, the secured peering program 110a, 110b may also provide the user with a "Request Access Key" button in the order summary page of the purchasing platform for requesting the temporary access key associated with the peering connection order. The secured peering program 110a, 110b may also provide a text field for the user to textually enter the user-defined timer and a check box to select the system-defined timer of 24 hours. The secured peering program 110a, 110b may receive the user request for the temporary access key when the user interacts with the user laptop and clicks the provided "Request Access Key" button in the order summary page of the purchasing platform and selects the check box for the system-defined timer of 24 hours.

Then, at 210, a temporary access key is assigned for the connection order. After the secured peering program 110a, 110b receives the user request for the temporary access key at 208, the secured peering program 110a, 110b may utilize the key management system to randomly generate a UUID for the temporary access key associated with the peering connection order. In at least one embodiment, the temporary access key may include an encrypted, randomly-generated 128-bit value. However, in another embodiment, the secured peering program 110a, 110b may provide an encrypted, randomly-generated temporary access key of any suitable size. The secured peering program 110a, 110b may implement the key management system to maintain an inventory including the service key, the temporary access key, and the associated peering connection order. In at least one embodiment, the secured peering program 110a, 110b may maintain the inventory of the service key, the temporary access key, and the associated peering connection order in the IAM system of the CSP. According to one embodiment, the secured peering program 110a, 110b may provide the temporary access key in the receipt or ticket generated for the peering connection order of the user. In another embodiment, the secured peering program 110a, 110b may provide the temporary access key for the peering connection order in the user account page of the CSP portal.

After the user receives the service key at 206 and the temporary access key at 210 for the peering connection order from the CSP, the user may share the service key and the temporary access key with the NSP. In one embodiment, the user may interact with the user device to log into an NSP portal or API. The user may request the peering connection with the CSP via a peering connection page of the NSP portal or API, where the user may textually enter, in respective text fields, the name of the CSP, the service key, and the temporary access key assigned to the peering connection order.

Continuing with the previous example, after receiving the user request for the temporary access key, the secured peering program 110a, 110b of the cloud company ABC may implement the key management system to randomly-generate a 128-bit temporary access key: "3982279a-39ab-4ed5-9fc6-543554f78275" for the peering connection order. Further, the secured peering program 110a, 110b may set a 24-hour expiration for the temporary access key based on the user selecting a user-defined timer via the user account page of the CSP portal. Then, the secured peering program 110a, 110b may record the temporary access key with the service key and the associated peering connection order in the inventory maintained by the key management system. The secured peering program 110a, 110b may provide the user with the temporary access key: "3982279a-39ab-4ed5-9fc6-543554f78275" in the peering connection order ticket via the order summary page of the purchasing platform.

Thereafter, the user may log into the NSP portal of the network company XYZ via the user laptop and select the peering connection option in the NSP portal to be directed to the peering connection page of the NSP portal. In the peering connection page, the user may textually enter: "Cloud Company ABC" in a text field labeled "CSP Entity Name," "519edd4e-d14b-4266-b3a2-2c78f9cd280b" in a text field labeled "Peering Connection Service key," and "3982279a-39ab-4ed5-9fc6-543554f78275" in a text field labeled "Peering Connection Temporary Access key."

Then, at 212, a request for connection parameters is received from the NSP of the user. In order to retrieve the connection parameters associated with the peering connection order of the mutual user, the NSP may communicate with the CSP of the mutual user via an API of the CSP. According to one embodiment, the secured peering program 110a, 110b may publish an API endpoint for the CSP, via communication network 116, to the internet. In one embodiment, the secured peering program 110a, 110b may publish a well-known API endpoint at a trusted domain name or hostname associated with the CSP. By publishing the API endpoint at a trusted domain name or hostname of the CSP, the secured peering program 110a, 110b may provide the NSP with a measure of security indicating that communications with the CSP may be trusted. In one embodiment, the NSP may determine the API endpoint of the CSP based on the CSP entity name provided by the user. In another embodiment, the user may provide the NSP with the API endpoint of the CSP via the NSP portal.

The secured peering program 110a, 110b may implement the API endpoint of the CSP using a representational state transfer (REST) architectural style. However, in other embodiments, the API endpoint of the CSP may be implemented by the secured peering program 110a, 110b to support any suitable architectural style. The NSP may use an NSP device running an API client (e.g., REST API client) to transmit a request to the API endpoint, via communication network 116. The secured peering program 110a, 110b may implement the API endpoint of the CSP to support various suitable API request methods from the NSP, including, but not limited to, the GET method. As such, the NSP may invoke (e.g., via REST API client) the API of the CSP using a GET request to retrieve one or more resources from the CSP, such as, the peering connection parameters pertaining to the peering connection order of the user.

According to one embodiment, the secured peering program 110a, 110b may implement the API of the CSP to return requested resources from the CSP if the API request includes valid shared secrets, such as, the service key and the temporary access key shared with the NSP by the user. The secured peering program 110a, 110b may determine from the service key and the temporary access key included in the API request from the NSP that the NSP has received authorization from the mutual user to retrieve the resources from the CSP.

In one embodiment, the secured peering program 110a, 110b may support an API request from the NSP including the following GET method:

[1]
GET "/v1/peering/{service-key}"
with data in the message body including, but not limited to,
{
...
"temporary-access-key": "xxxxxxx",
...
}

In snippet [1] of the GET method above, the "service-key" may uniquely identify the peering connection order of the user and the "temporary-access-key" may enable temporary permission to retrieve the parameters or properties associated with the peering connection order from the CSP. In one embodiment, the message body may include data or other parameters (e.g., peering location, speed) for additional cross-checks between the NSP and the CSP to ensure that the peering connection order of the user is accurately identified.

Continuing with the previous example, the secured peering program 110a, 110b of the cloud company ABC may publish an API endpoint at "peerlink.cloud.abc.com" having a REST architectural style and supporting API requests implemented using the GET method. The user may request the peering connection order with the NSP, network company XYZ, and may share the CSP entity name, the service key, and the temporary access key provided to the user by the secured peering program 110a, 110b of the cloud company ABC. Then, the network company XYZ may use a REST API client running on the NSP device to invoke an API request, via communication network 116, to the API endpoint "peerlink.cloud.abc.com." The API request from the network company XYZ may include the CSP entity name, the service key, and the temporary access key shared by the user via the NSP portal.

The secured peering program 110a, 110b of the cloud company ABC may receive, at the API endpoint "peerlink.cloud.abc.com," the API request from the REST API client running on the device of network company XYZ in the following GET method format:

```
                                                                    [2]
GET "/v1/peering/{519edd4e-d14b-4266-b3a2-2c78f9cd280b}"
{
...
"temporary-access-key": "3982279a-39ab-4ed5-9fc6-543554f78275",
...
}
```

Then, at 214, the secured peering program 110a, 110b determines if the request received from the NSP is valid. The secured peering program 110a, 110b may determine that the request for the peering connection parameters from the NSP is valid if the method of the API request includes a valid service key and a valid temporary access key for the peering connection order of the user. Specifically, the secured peering program 110a, 110b may identify the service key and the temporary access key received from the NSP via the API request and compare the received keys with the service key and the temporary access key maintained in the inventory of the key management system for the particular peering connection order. In at least one embodiment, the secured peering program 110a, 110b of the CSP may implement an internal service access key that enables the secured peering program 110a, 110b to validate the API request of the NSP.

If the secured peering program 110a, 110b of the CSP determines that the API request received from the NSP is not valid at 214, the secured peering program 110a, 110b will return an error for invalid request at 216. The secured peering program 110a, 110b of the CSP may determine that the API request is invalid if the service key and/or the temporary access key received from the NSP via the API request do not match the service key and/or the temporary access key maintained in the inventory of the key management system for the particular peering connection order. In one embodiment, the secured peering program 110a, 110b of the CSP may determine that the API request is invalid if the temporary access key received from the NSP via the API request is expired. If the API request of the NSP is determined to be invalid, the secured peering program 110a, 110b of the CSP may return a statement of error for the invalid request to API client running on the NSP device via communication network 116.

If, however, the secured peering program 110a, 110b of the CSP determines that the API request received from the NSP is valid at 214, the secured peering program 110a, 110b will return the peering connection parameters to the NSP of the user at 218. The secured peering program 110a, 110b may transmit the peering connection parameters to the API client running on the NSP device via communication network 116. According to one embodiment, the peering connection parameters returned by the secured peering program 110a, 110b of the CSP to the API client of the NSP device may include, among others, the peering location, speed, virtual local area network identification (VLAN ID), and port identification (Port ID) for the peering connection order of the user. In at least one embodiment, the secured peering program 110a, 110b may return a response to the API client of the NSP device in the following format:

```
                                                                    [3]
{
"location": "xxxxx",
"speed": "xxx Mbps",
"VLAN ID": xx,
"Port ID", "xxxxxxx"
...
}
```

After the secured peering program 110a, 110b of the CSP returns the peering connection parameters to the API client of the NSP device, the NSP may use the VLAN ID and the Port ID from snippet [3] of the CSP response to configure the peering connection and complete the peering connection between the CSP and the NSP of the mutual user.

Continuing with the previous example, after the secured peering program 110a, 110b of the cloud company ABC receives the request for connection parameters from the network company XYZ in the form of the API request as described at 212, the secured peering program 110a, 110b may identify and validate the service key: "519edd4e-d14b-4266-b3a2-2c78f9cd280b," and the temporary access key "3982279a-39ab-4ed5-9fc6-543554f78275" in snippet [2] received from the network company XYZ in the API request at 214. Then, the secured peering program 110a, 110b may compare and match the received keys with the service key and the temporary access key maintained in the inventory of the key management system for the particular peering connection order and determine that the service key and the temporary access key received from the network company XYZ is valid. Thereafter, the secured peering program 110a, 110b of the cloud company ABC may return the following response to the REST API client running on the device of network company XYZ at 218:

```
                                                                    [4]
{
"location": "Dallas",
"speed": "100 Mbps",
"VLAN ID": 42,
"Port ID", "DALLAS_EQUNIX_CLOUD_EXCHANGE_PORT_1"
...
}
```

The network company XYZ may then use the VLAN ID and the Port ID received in snippet [4] of the response from the cloud company ABC to configure the peering connection requested by the user and complete the peering connection between the cloud company ABC and the network company XYZ.

As described herein, the secured peering program 110a, 110b may have the capacity to improve the technical field of cloud computing by providing a mutual user of a CSP and an NSP with a secure, light-weight mechanism to authorize the NSP to access the properties of a network resource (e.g., a peering connection) from a platform of the CSP. Specifically, the secured peering program 110a, 110b may provide the mutual user with a shared secret which, when provided to the CSP by the NSP, may grant the NSP with temporary permission to retrieve connection parameters from the CSP, without requiring the CSP to perform formal authentication to identify the NSP. By enabling the mutual user to authorize the NSP by providing the NSP with the shared secret, the secured peering program 110a, 110b of the CSP may conserve the costs and resources associated with NSP account management and integration with the CSP. Thus, the secured peering program 110a, 110b may improve the functionality of a computer.

It may be appreciated that FIG. 2 provides only an illustration of one embodiment and does not imply any limitations with regard to how different embodiments may be implemented. Many modifications to the depicted embodiment(s) may be made based on design and implementation requirements. For example, according to another embodiment, the secret-based parameter sharing process 200 illustrated in FIG. 2 may be implemented to extend the cloud-premises network of the user with additional cloud-premises networks to provide a multi-cloud network environment for the user.

Figure 3:
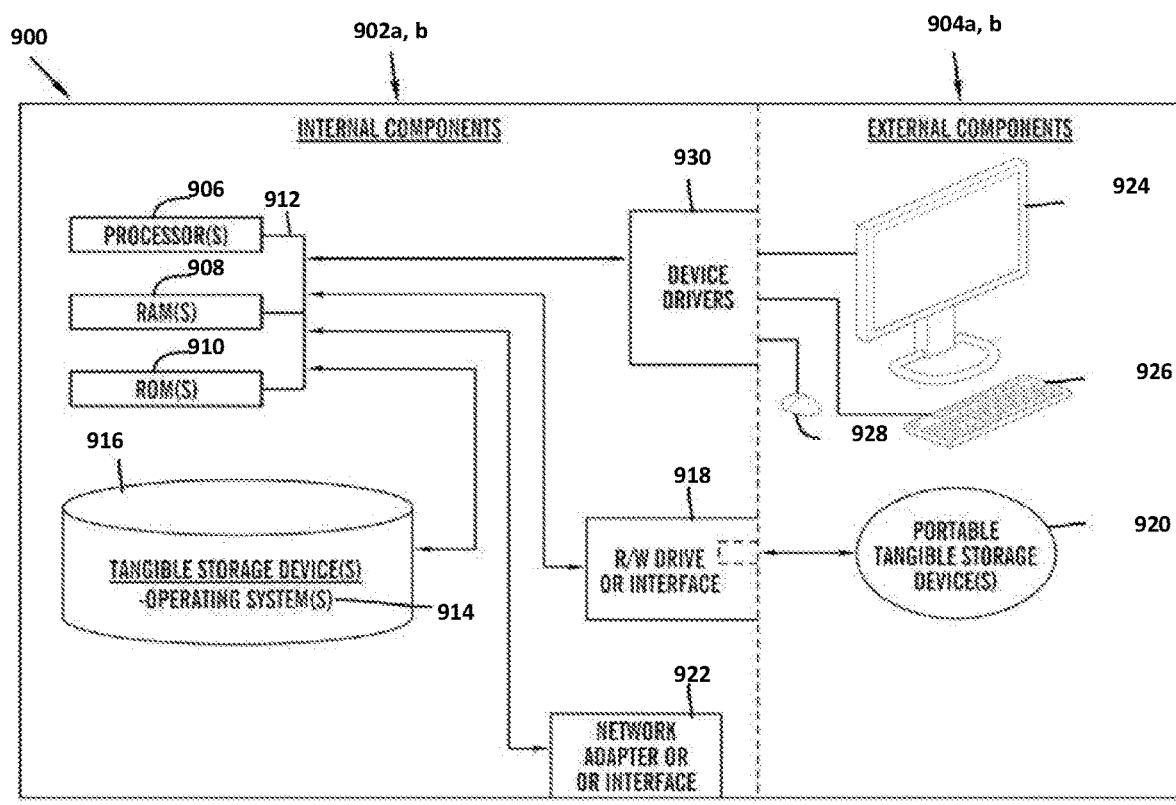
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the secured peering program 110a in client computer 102, and the secured peering program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the secured peering program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the secured peering program 110a in client computer 102 and the secured peering program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the secured peering program 110a in client computer 102 and the secured peering program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
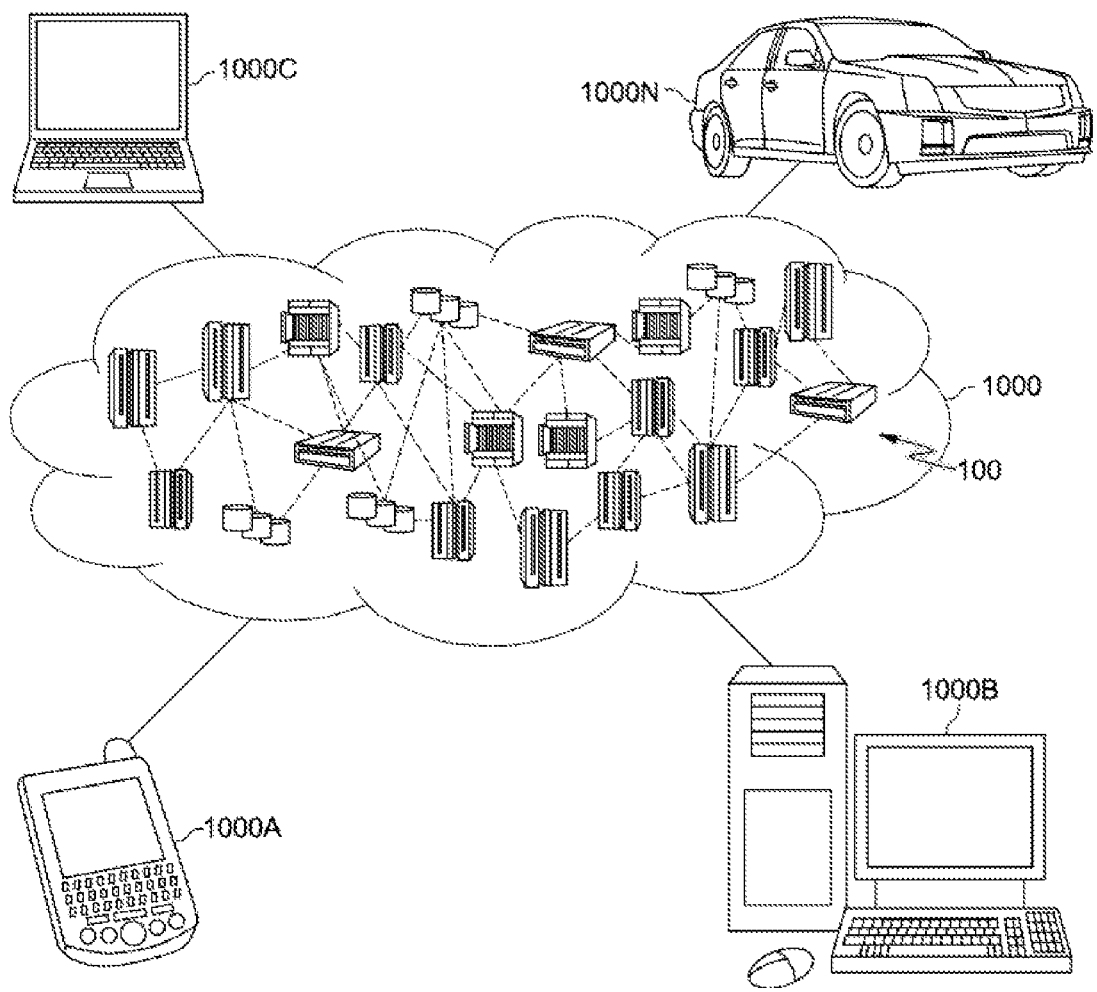
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
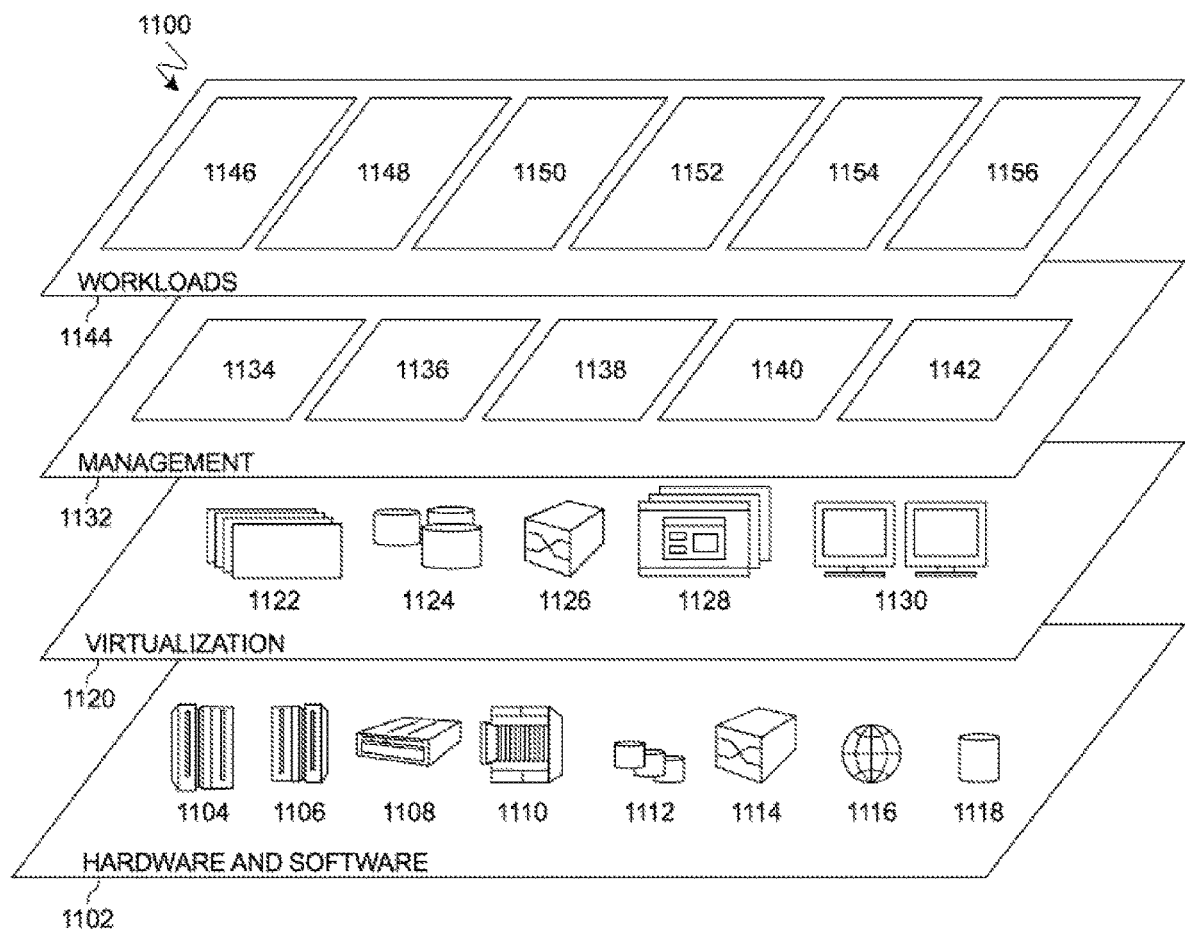
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture-based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and secured parameter delivery 1156. A secured peering program 110a, 110b provides a way for a cloud service provider to securely share peering connection parameters with a network service provider.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for sharing a peering connection parameter, the method comprising:
   receiving a peering connection order from a user;
   assigning at least one shared secret to the received peering connection order;
   receiving a request from a network service provider of the user for at least one connection parameter associated with the received peering connection order, wherein the received request includes the at least one shared secret for the received peering connection order; and
   in response to determining that the at least one shared secret included in the received request is valid, returning the at least one connection parameter associated with the received peering connection order to the network service provider of the user.

2. The method of claim 1, further comprising:
   publishing an application programming interface at a domain name of a cloud service provider of the user; and
   configuring the published application programming interface to receive the request from the network service provider of the user.

3. The method of claim 1, further comprising:
   maintaining an inventory of the received peering connection order; and
   storing in the maintained inventory, the assigned at least one shared secret for the received peering connection order.

4. The method of claim 1, wherein assigning the at least one shared secret for the received peering connection order further comprises:
   providing a service key for the received peering connection order, wherein the provided service key is randomly generated; and
   providing a temporary access key for the received peering connection order, wherein the provided temporary access key is randomly generated.

5. The method of claim 3, further comprising:
   identifying the at least one shared secret included in the received request from the network service provider of the user;
   comparing the identified at least one shared secret in the received request with the stored at least one shared secret in the maintained inventory; and
   in response to matching the identified at least one shared secret and the stored at least one shared secret, determining that the identified at least one shared secret included in the received request is valid.

6. The method of claim 4, wherein receiving the request from the network service provider of the user further comprises:
   receiving the provided service key from the network service provider of the user; and
   receiving the provided temporary access key from the network service provider of the user, wherein the network service provider receives the received service key and the received temporary access key from the user.

7. The method of claim 4, further comprising:
   providing the temporary access key to expire after a system-defined period of time;
   providing a user option for the provided temporary access key to expire after a user-defined period of time; and
   in response to receiving a selection for the provided user option, implementing the provided temporary access key to expire after the user-defined period of time.

8. A computer system for sharing a peering connection parameter, comprising:
   one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
   receiving a peering connection order from a user;
   assigning at least one shared secret to the received peering connection order;
   receiving a request from a network service provider of the user for at least one connection parameter associated with the received peering connection order, wherein the received request includes the at least one shared secret for the received peering connection order; and
   in response to determining that the at least one shared secret included in the received request is valid, returning the at least one connection parameter associated with the received peering connection order to the network service provider of the user.

9. The computer system of claim 8, further comprising:
   publishing an application programming interface at a domain name of a cloud service provider of the user; and
   configuring the published application programming interface to receive the request from the network service provider of the user.

10. The computer system of claim 8, further comprising:
    maintaining an inventory of the received peering connection order; and
    storing in the maintained inventory, the assigned at least one shared secret for the received peering connection order.

11. The computer system of claim 8, wherein assigning the at least one shared secret for the received peering connection order further comprises:
    providing a service key for the received peering connection order, wherein the provided service key is randomly generated; and
    providing a temporary access key for the received peering connection order, wherein the provided temporary access key is randomly generated.

12. The computer system of claim 10, further comprising:
    identifying the at least one shared secret included in the received request from the network service provider of the user;

comparing the identified at least one shared secret in the received request with the stored at least one shared secret in the maintained inventory; and in response to matching the identified at least one shared secret and the stored at least one shared secret, determining that the identified at least one shared secret included in the received request is valid.

13. The computer system of claim 11, wherein receiving the request from the network service provider of the user further comprises:

receiving the provided service key from the network service provider of the user; and receiving the provided temporary access key from the network service provider of the user, wherein the network service provider receives the received service key and the received temporary access key from the user.

14. The computer system of claim 11, further comprising:

providing the temporary access key to expire after a system-defined period of time;

providing a user option for the provided temporary access key to expire after a user-defined period of time; and in response to receiving a selection for the provided user option, implementing the provided temporary access key to expire after the user-defined period of time.

15. A computer program product for sharing a peering connection parameter, comprising:

one or more computer-readable tangible storage media and program instructions stored on at least one of the one or more computer-readable tangible storage media, the program instructions executable by a processor to cause the processor to perform a method comprising:

receiving a peering connection order from a user;

assigning at least one shared secret to the received peering connection order;

receiving a request from a network service provider of the user for at least one connection parameter associated with the received peering connection order, wherein the received request includes the at least one shared secret for the received peering connection order; and in response to determining that the at least one shared secret included in the received request is valid, returning the at least one connection parameter associated with the received peering connection order to the network service provider of the user.

16. The computer program product of claim 15, further comprising:

publishing an application programming interface at a domain name of a cloud service provider of the user; and configuring the published application programming interface to receive the request from the network service provider of the user.

17. The computer program product of claim 15, further comprising:

maintaining an inventory of the received peering connection order; and storing in the maintained inventory, the assigned at least one shared secret for the received peering connection order.

18. The computer program product of claim 15, wherein assigning the at least one shared secret for the received peering connection order further comprises:

providing a service key for the received peering connection order, wherein the provided service key is randomly generated; and providing a temporary access key for the received peering connection order, wherein the provided temporary access key is randomly generated.

19. The computer program product of claim 17, further comprising:

identifying the at least one shared secret included in the received request from the network service provider of the user;

comparing the identified at least one shared secret in the received request with the stored at least one shared secret in the maintained inventory; and in response to matching the identified at least one shared secret and the stored at least one shared secret, determining that the identified at least one shared secret included in the received request is valid.

20. The computer program product of claim 18, wherein receiving the request from the network service provider of the user further comprises:

receiving the provided service key from the network service provider of the user; and receiving the provided temporary access key from the network service provider of the user, wherein the network service provider receives the received service key and the received temporary access key from the user.

* * * * *